US010423166B2

(12) United States Patent
Wegend et al.

(10) Patent No.: US 10,423,166 B2
(45) Date of Patent: Sep. 24, 2019

(54) METHOD AND APPARATUS FOR FURNISHING A SIGNAL FOR OPERATING AT LEAST TWO VEHICLES ALONG A FIRST TRAJECTORY

(71) Applicant: Robert Bosch GmbH, Stuttgart (DE)

(72) Inventors: Christian Wegend, Ditzingen (DE); Martin Rous, Mundelsheim (DE); Volker Hofsaess, Moeglingen (DE)

(73) Assignee: Robert Bosch GmbH, Stuttgart ( * ) Notice: Subject to any disclaimer, the term of this patent is extended or adjusted under 35 U.S.C. 154(b) by 25 days.

(21) Appl. No.: 15/812,772

(22) Filed: Nov. 14, 2017

(65) Prior Publication Data

US 2018/0157273 A1    Jun. 7, 2018

(30) Foreign Application Priority Data

Dec. 5, 2016  (DE) .................... 10 2016 224 109

(51) Int. Cl.
*G05D 1/02*   (2006.01)
*B60Q 1/00*   (2006.01)

(52) U.S. Cl.
CPC ......... *G05D 1/0287* (2013.01); *G05D 1/0246* (2013.01); *G05D 1/0255* (2013.01); *G05D 1/0257* (2013.01); *G05D 1/0276* (2013.01)

(58) Field of Classification Search
CPC . G05D 1/02; B60Q 1/00; G01C 23/00; B60K 31/0008; G08G 1/09; B60F 99/00; G06G 7/48

See application file for complete search history.

(56) References Cited

U.S. PATENT DOCUMENTS

| 6,418,370 | B1* | 7/2002 | Isogai | B60K 31/0008 |
| | | | | 180/170 |
| 7,739,087 | B2* | 6/2010 | Qiu | G07C 5/085 |
| | | | | 340/901 |
| 8,344,864 | B1* | 1/2013 | Al-Mutawa | B60W 50/12 |
| | | | | 340/435 |
| 9,671,791 | B1* | 6/2017 | Paczan | B64C 39/024 |

(Continued)

FOREIGN PATENT DOCUMENTS

| DE | 10314119 A1 | 10/2004 |
| DE | 102012215064 A1 | 2/2014 |
| DE | 102015210833 A1 | 12/2016 |

*Primary Examiner* — Yuri Kan
(74) *Attorney, Agent, or Firm* — Norton Rose Fulbright US LLP; Gerard Messina

(57) ABSTRACT

A method and a first apparatus for furnishing a signal for operating at least two vehicles along a first trajectory, having a step of ascertaining first environmental data values by way of at least one sensor of the at least two vehicles, the first environmental data values representing a first environment of the at least two vehicles; and a step of ascertaining second environmental data values from an external server, the second environmental data values representing a second environment, dependent on the first trajectory, of the at least two vehicles, the first environment being encompassed by the second environment. The method furthermore encompasses a step of determining data values on the basis of the first and second environmental data values, and a step of furnishing a signal, on the basis of the determined data values, for operating the at least two vehicles.

15 Claims, 4 Drawing Sheets

(56) References Cited

U.S. PATENT DOCUMENTS

| | | | | |
|---|---|---|---|---|
| 2011/0298602 | A1* | 12/2011 | Chen | B60Q 9/008 340/435 |
| 2013/0127639 | A1* | 5/2013 | Hassanzadeh Toreh | G08G 1/09 340/905 |
| 2013/0184926 | A1* | 7/2013 | Spero | B62D 1/28 701/26 |
| 2013/0319284 | A1* | 12/2013 | Shinmura | B61C 17/00 105/453 |
| 2018/0356836 | A1* | 12/2018 | Rous | G05D 1/0022 |

* cited by examiner

METHOD AND APPARATUS FOR FURNISHING A SIGNAL FOR OPERATING AT LEAST TWO VEHICLES ALONG A FIRST TRAJECTORY

CROSS REFERENCE

The present application claims the benefit under 35 U.S.C. § 119 of German Patent Application No. DE 102016224109.5 filed on Dec. 5, 2016, which is expressly incorporated herein by reference in its entirety.

FIELD

The present invention relates to a method and a first apparatus for furnishing a signal for operating at least two vehicles along a first trajectory, first and second environmental data values being ascertained, data values being determined on the basis of the first and second environmental data values, and a signal being furnished on the basis of the determined data values. It furthermore relates to a second apparatus for operating a vehicle.

SUMMARY

The method according to the present invention for furnishing a signal for operating at least two vehicles along a first trajectory encompasses a step of ascertaining first environmental data values by way of at least one sensor of the at least two vehicles, the first environmental data values representing a first environment of the at least two vehicles; and a step of ascertaining second environmental data values from an external server, the second environmental data values representing a second environment, dependent on the first trajectory, of the at least two vehicles, the first environment being encompassed by the second environment. The method furthermore encompasses a step of determining data values on the basis of the first and second environmental data values, and a step of furnishing a signal, on the basis of the determined data values, for operating the at least two vehicles.

An "environment" is to be understood as a region in which at least one of the at least two vehicles is located. It can be understood as a physical environment in the form of environmental features (houses, trees, etc.) and/or the type of road (main road, dirt road, expressway, etc.) and/or weather conditions (wind conditions, precipitation).

A "vehicle" can be understood as a vehicle operated manually, for example by a driver, and/or as a partly, highly, or fully automated vehicle. A "vehicle" can furthermore be understood as a passenger car and/or a truck and/or as two-wheeled vehicles and/or other vehicles, for example agricultural machines and/or heavy equipment (excavators, etc.).

The method according to the present invention has the advantage that the environment of the at least two vehicles is ascertained in two different ways and is plausibilized by comparison. This enhances not only safety in the context of operation of the at least two vehicles but also effectiveness in terms of operation, for example by way of a higher speed and/or by way of a shorter travel time and/or by way of a lower energy consumption. The first and second environmental data values can furthermore supplement one another, thereby ensuring an improved knowledge of the environment of the at least two vehicles.

Particularly preferably, the first environmental data values are ascertained by way of the at least one sensor of the at least two vehicles in such a way that a deviation of at least one of the at least two vehicles from the first trajectory is detected.

A "deviation from the first trajectory" is to be understood to mean, for example, that at least one of the at least two vehicles moves to the edge of a travel lane, to the left or right, within the travel lane; the "trajectory" is to be understood as a line approximately at the center of the travel lane, along which a predefined center of the vehicle (within a predefined tolerance range of, for example, 20 cm) moves. A "deviation" can furthermore be understood to mean, for example, that at least one of the at least two vehicles moves into a different travel lane or approaches an edge of the road, for example a planting at the side of the roadway.

Detection of a deviation is particularly advantageous because it is particularly relevant to the safety of the at least two vehicles in a context in which the at least two vehicles are driving one behind another, since that deviation can result in an unforeseen change in the spacing between the vehicles and/or in an unforeseen change in the speed of the vehicles and/or in unforeseen acceleration behavior by the vehicles.

The first environmental data values are preferably ascertained, as a function of the detected deviation, in such a way that the first environmental data values encompass air flows.

"Air flows" are to be understood, for example, as wind conditions and/or storm gusts. "Air flows" can furthermore also be understood as the wind blasts of other vehicles.

This is particularly advantageous because, for example, in particular in the case of trucks, it is specifically side winds that can result in unforeseen deviations e.g. from a predefined trajectory, and those deviations can thus be taken into account in the context of operation of the at least two vehicles.

Preferably the signal is furnished in such a way that manual operation of at least one of the at least two vehicles is requested, and/or a second trajectory that deviates from the first trajectory is determined for at least one of the at least two vehicles, and/or a change in speed occurs for at least one of the at least two vehicles, and/or a change in spacing between the at least two vehicles occurs.

"Manual operation" is to be understood to mean that at least one driver of the at least two vehicles is prompted, for example by way of an acoustic and/or visual and/or haptic signal, to take control of the vehicle. This operation can be completed by the fact that the driver actuates a steering wheel and/or a pedal and/or an operating surface predetermined therefor.

A "change in speed" can be understood as both an increase and a decrease in the speed of at least one of the at least two vehicles, in which context, for example, as a result of the change in speed the spacing between the at least two vehicles becomes too great and/or too small in accordance with predefined criteria. A "change in spacing" can be understood as both an increase and a decrease in the spacing between the at least two vehicles, in which context the spacing between the at least two vehicles becomes too great and/or too small, in accordance with predefined criteria, as a result of the change in spacing.

The predefined criteria can encompass safety-related aspects and/or aspects relevant to energy efficiency, for example the fuel consumption of at least one of the at least two vehicles.

The advantage apparent here is that in the event of a partial or complete failure of the technical systems of at least one of the at least two vehicles, and/or in a context of unforeseen events, the safety of the at least two vehicles and the safety of further traffic participants in the vicinity of the at least two vehicles continues to exist, since at least one driver can take control.

Preferably the first and/or second environmental data values are ascertained in such a way that the first and/or second environmental data values encompass a traffic density along the first trajectory.

A "traffic density" can be understood both as the entirety of the traffic within the first and/or second environment and as only the volume or number of specific vehicles within specific groups of traffic participants, for example oncoming traffic and/or traffic moving in the same travel direction and/or exclusively trucks and/or passenger cars and/or further groups.

This has the advantage that, for example, hazard situations that can arise in particular on the basis of further traffic participants can be correspondingly taken into account.

The data values are preferably determined on the basis of the first and second environmental data values in such a way that the first and the second environmental data values are plausibilized in accordance with predefined plausibilization criteria.

This advantageously permits reliable findings than in the case of exclusive determination of the first or second environmental data values, thereby enhancing safety both for the at least two vehicles and for any further traffic participants that may be present. Further conditions, for example wind conditions, which can change particularly quickly, can furthermore be more reliably predicted and determined.

In a particularly preferred embodiment, the first and/or second environmental data values are ascertained in such a way that the first and/or second environmental data values encompass a road state and/or a friction value associated with the road state, the road state representing a state of a surface finish of a road used by the at least two vehicles and/or a road segment being used.

This is particularly advantageous because the road state or the friction value associated with the road state is, in particular, very important in terms of the driving safety of the at least two vehicles. The friction value furthermore has a large influence on the braking behavior and/or acceleration behavior of the at least two vehicles. The safety of the at least two vehicles is thus crucially enhanced if the friction value is also detected.

The first apparatus according to the present invention for furnishing a signal for operating at least two vehicles along a first trajectory encompasses first device for ascertaining first environmental data values by way of at least one sensor of the at least two vehicles, the first environmental data values representing a first environment of the at least two vehicles; and second device for ascertaining second environmental data values from an external server, the second environmental data values representing a second environment, dependent on the first trajectory, of the at least two vehicles, the first environment being encompassed by the second environment. The first apparatus furthermore encompasses a third device for determining data values on the basis of the first and second environmental data values, and a further device for furnishing a signal, on the basis of the determined data values, for operating the at least two vehicles.

Preferably the first device and/or the second device and/or the third device and/or the further device are embodied to execute a method in accordance with at least one of the method claims.

The second apparatus according to the present invention for operating a vehicle encompasses transmitting and receiving device for transmitting data, the data being acquired by at least one sensor of the vehicle, and/or for receiving a signal for operating the vehicle, the signal being furnished in accordance with the present invention; and a vehicle device for operating the vehicle as a function of the received signal.

Advantageous refinements of the present invention are described herein and are shown in the figures.

BRIEF DESCRIPTION OF THE DRAWINGS

Exemplifying embodiments of the present invention are depicted in the figures and are explained in further detail below.

DETAILED DESCRIPTION OF EXAMPLE EMBODIMENTS

Figure 1:
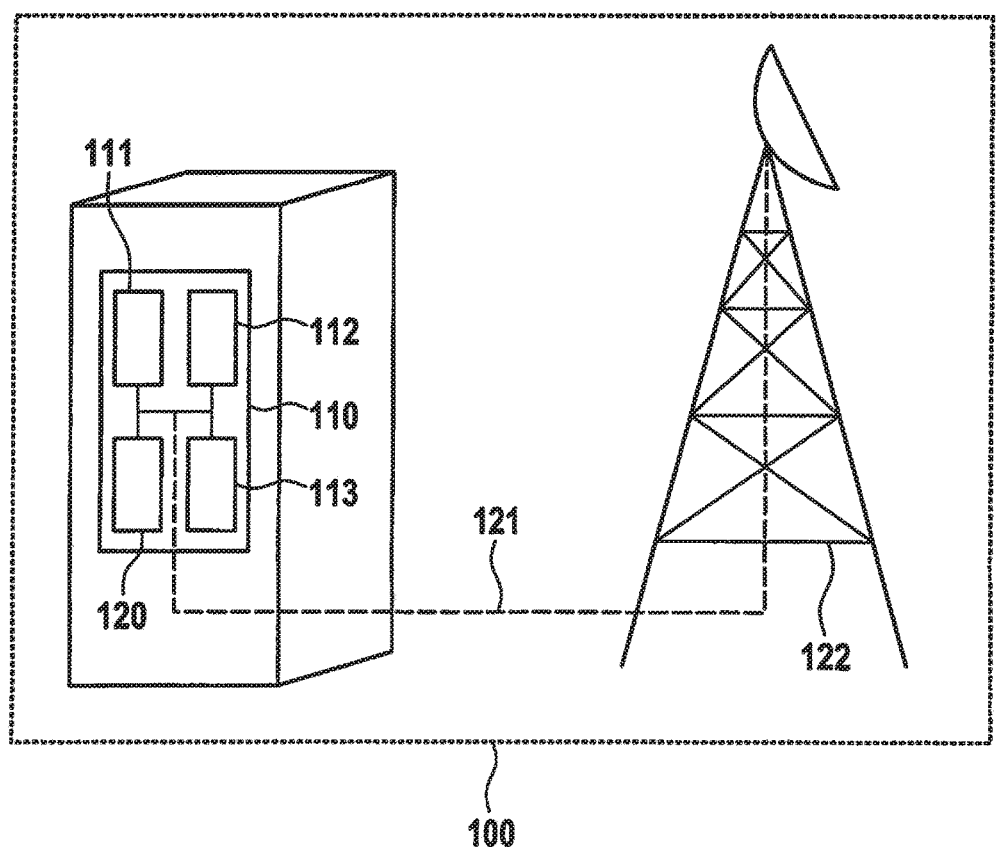
FIG. 1 shows, purely by way of example, a computation unit that encompasses a first apparatus for furnishing a signal for operating at least two vehicles.

FIG. 1 shows a computation unit 100, depicted by way of example, that encompasses a first apparatus 110 for furnishing a signal for operating at least two vehicles 310, 320 along a first trajectory 330. A "computation unit" 100 is to be understood, for example, as a server. In a further embodiment, a "computation unit" 100 is to be understood as a cloud, i.e. an assemblage of at least two electrical data processing systems that exchange data, for example, via the internet. In a further embodiment, computation unit 100 corresponds to first apparatus 110.

First apparatus 110 encompasses a first device 111 for ascertaining 420 first environmental data values, and second device 112 for ascertaining 430 second environmental data values from an external server 390. First apparatus 110 furthermore encompasses a third device 113 for determining 440 data values on the basis of the first and second environmental data values, and a further device 120 for furnishing 450 a signal, on the basis of the determined data values, for operating the at least two vehicles 310, 320.

First device 111 and/or second device 112 and/or third device 113 and/or further device 120 can be embodied differently depending on the respective embodiment of computation unit 100. If computation unit 100 is embodied as a server, first device 111 and/or second device 112 and/or third device 113 and/or further device 120 are localized at the same location with reference to the location of first apparatus 110. If computation unit 100 is embodied as a cloud, first device 111 and/or second device 112 and/or third device 113 and/or further device 120 can be localized at different locations, for example in different cities and/or in different countries, a connection (for example the internet) for the exchange of (electronic) data being embodied between first device 111 and/or second device 112 and/or third device 113 and/or further device 120.

First device 111 is embodied to ascertain first environmental data values. First device 111 encompass a receiving and/or transmitting unit by way of which data are requested and/or received. In a further embodiment, first device 111 is embodied in such a way that it is connected, by way of a wired and/or wireless connection 121, to a transmitting and/or receiving unit 122 disposed externally on the basis of first apparatus 110. First device 111 furthermore encompass electronic data processing elements, for example a processor, working memory, and a hard drive, which are embodied to process the ascertained environmental data, for example to perform a modification and/or adaptation of the data format, and then to convey them to third device 113. In a further embodiment, first device 111 is embodied so as to convey the ascertained environmental data values, without data processing elements, to third device 113.

The first apparatus furthermore encompasses second device 112 that is embodied to ascertain second environmental data values. The embodiment of second device 112 corresponds to at least one embodiment of first device 111.

In a further embodiment of first apparatus 110, first device 111 and second device 112 are identical, i.e. are embodied to ascertain the first and the second environmental data values.

First apparatus 110 furthermore encompasses third device 113 for determining data values from the determined first and second environmental data values. Third device 113 encompasses electronic data processing elements for that purpose, for example a processor, working memory, and a hard drive. Third device 113 furthermore encompasses corresponding software that is embodied to determine data values, in accordance with method 400 according to the present invention, from the first and/or second environmental data values acquired by way of first device 111 and/or second device 112.

The data values are determined, for example, by combining the first and the second environmental data values. This ensures a more accurate knowledge of the actual environment of the at least two vehicles than if only the first or the second environmental data values were ascertained.

In a further embodiment, the first and the second environmental data values are compared so as to plausibilize one another. For example, wind speeds and/or traffic densities and/or road states, which are respectively encompassed by the first and second environmental data values, can be compared with one another. The data values are then determined, for example, in such a way that they contain only information that appears plausible in accordance with pre-defined criteria. This is the case, for example, if values for wind speeds and/or traffic densities (e.g., in the form of vehicles per road segment), and/or further variables that are encompassed by the first and second environmental data values, deviate by a maximum of 5% from one another.

First apparatus 110 furthermore encompasses further device 120 for furnishing a signal. Further device 120 encompasses for that purpose a receiving and/or transmitting unit with which data are requested and/or received. In a further embodiment, further device 120 is embodied in such a way that it is connected, by way of a wired and/or wireless connection 121, to a transmitting and/or receiving unit 122 disposed externally on the basis of first apparatus 110. In a further embodiment, the transmitting and/or receiving device are identical to the transmitting and/or receiving device of first device 111 and/or to the transmitting and/or receiving device of second device 112.

Further device 120 furthermore encompasses electronic data processing elements, for example a processor, working memory, and a hard drive, which are embodied to process the determined data, for example to execute a modification and/or adaptation of the data format, and then to furnish them as a signal.

The signal is furnished from the determined data values, for example, in such a way that it encompasses a change in spacing between the at least two vehicles 310, 320 which appears necessary based on the ascertained first and/or second environmental data values. The signal can furthermore be furnished, as a function of the determined data values, in such a way that it encompasses, for at least one of the at least two vehicles 310, 320, a change in speed and/or a deviation from first trajectory 330 and/or a change in the first trajectory and/or a further change in a driving state.

Figure 2:
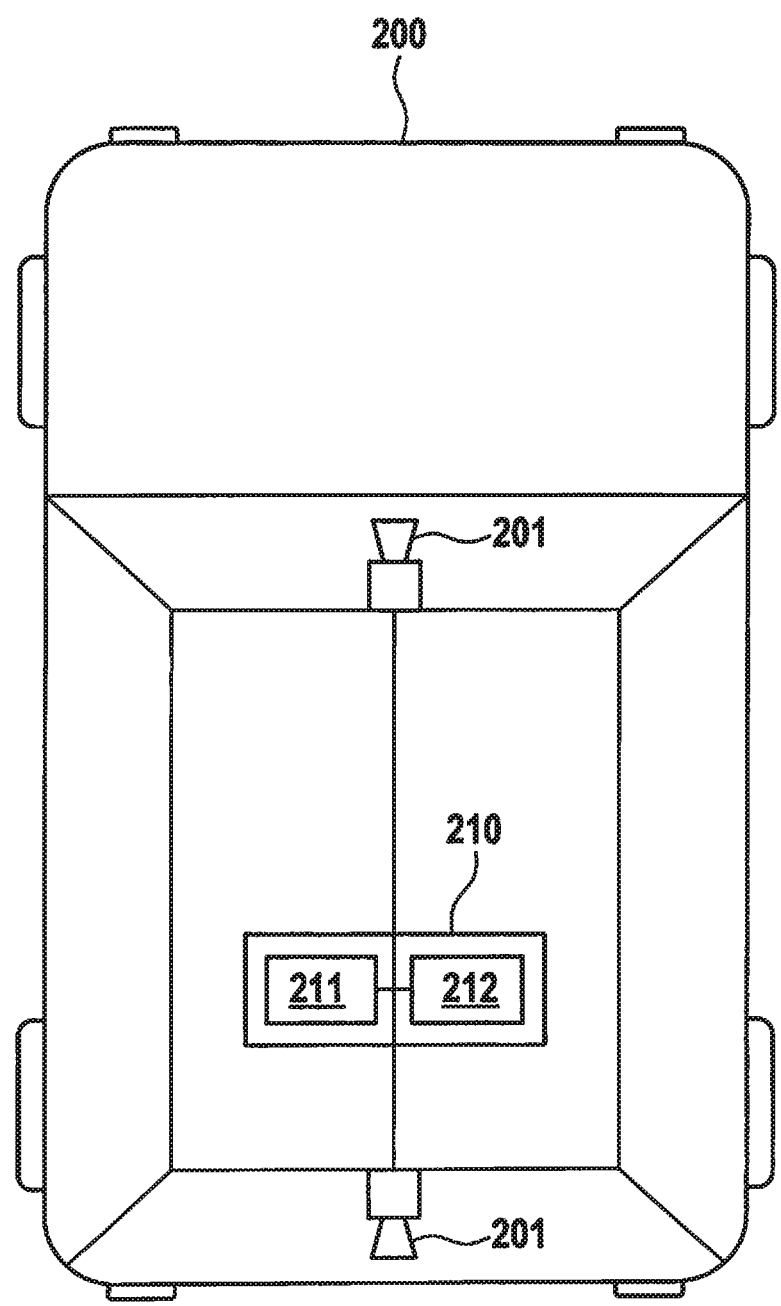
FIG. 2 shows, purely by way of example, a vehicle that encompasses the second apparatus according to the present invention for operating a vehicle.

FIG. 2 shows a vehicle that encompasses a second apparatus 210 for operating a vehicle. Vehicle 200 is embodied here as a passenger car. In further embodiments, vehicle 200 is embodied in particular as a truck or as a two-wheeled vehicle.

Second apparatus 210 encompasses transmitting and receiving device 211 for receiving a signal for operating vehicle 200, and vehicle device 212 for operating vehicle 200.

Transmitting and receiving device 211 is embodied to receive a signal. Transmitting and receiving device 211 encompasses for that purpose a receiving and/or transmitting unit by way of which signals are requested and/or received. In a further embodiment, receiving device 211 is embodied in such a way that it is connected, by way of a wired and/or wireless connection, to a transmitting and/or receiving unit disposed externally on the basis of second apparatus 210. This can involve, for example, a navigation system that is encompassed by vehicle 200.

In a further embodiment, transmitting and receiving device 211 is embodied so that it is connected to a mobile receiving device, in particular to a smartphone. This connection can be accomplished, for example, by way of a wired and/or wireless connection, for example Bluetooth.

Transmitting and receiving device 211 are furthermore embodied so as to convey the received signal to vehicle device 212. In a further embodiment, transmitting and receiving device 211 encompasses electronic data processing elements, for example a processor, working memory, and a hard drive, which are embodied to process the received signal, for example to execute a modification and/or adaptation of the data format, and then to convey it to vehicle device 212.

Vehicle 200 further encompasses at least one sensor 201 that is embodied to detect an environment of vehicle 200 in the form of environmental data values. The at least one sensor can be embodied, for example, as a video and/or radar and/or ultrasonic and/or lidar sensor, and/or as a further sensor type that is suitable for detecting the environment of vehicle 200.

The acquired environmental data values that are acquired by way of the at least one sensor 201 can be transferred by way of transmitting and receiving device 211 to an external computation unit.

Second apparatus 210 furthermore encompasses vehicle device 212 for operating vehicle 200. Vehicle device 212 is embodied for that purpose, for example, so as to convey the signal, received by way of transmitting and receiving device 211, to a control device of vehicle 200. In a further embodiment, vehicle device 212 is embodied to exert influence on vehicle 200 as a function of the signal. This can involve, for example, displaying the signal by way of a display, suitable therefor, in vehicle 200. An influence on the driving behavior of vehicle 200, for example in the form of a change in direction and/or in speed, can also occur on the basis of the signal.

Figure 3:
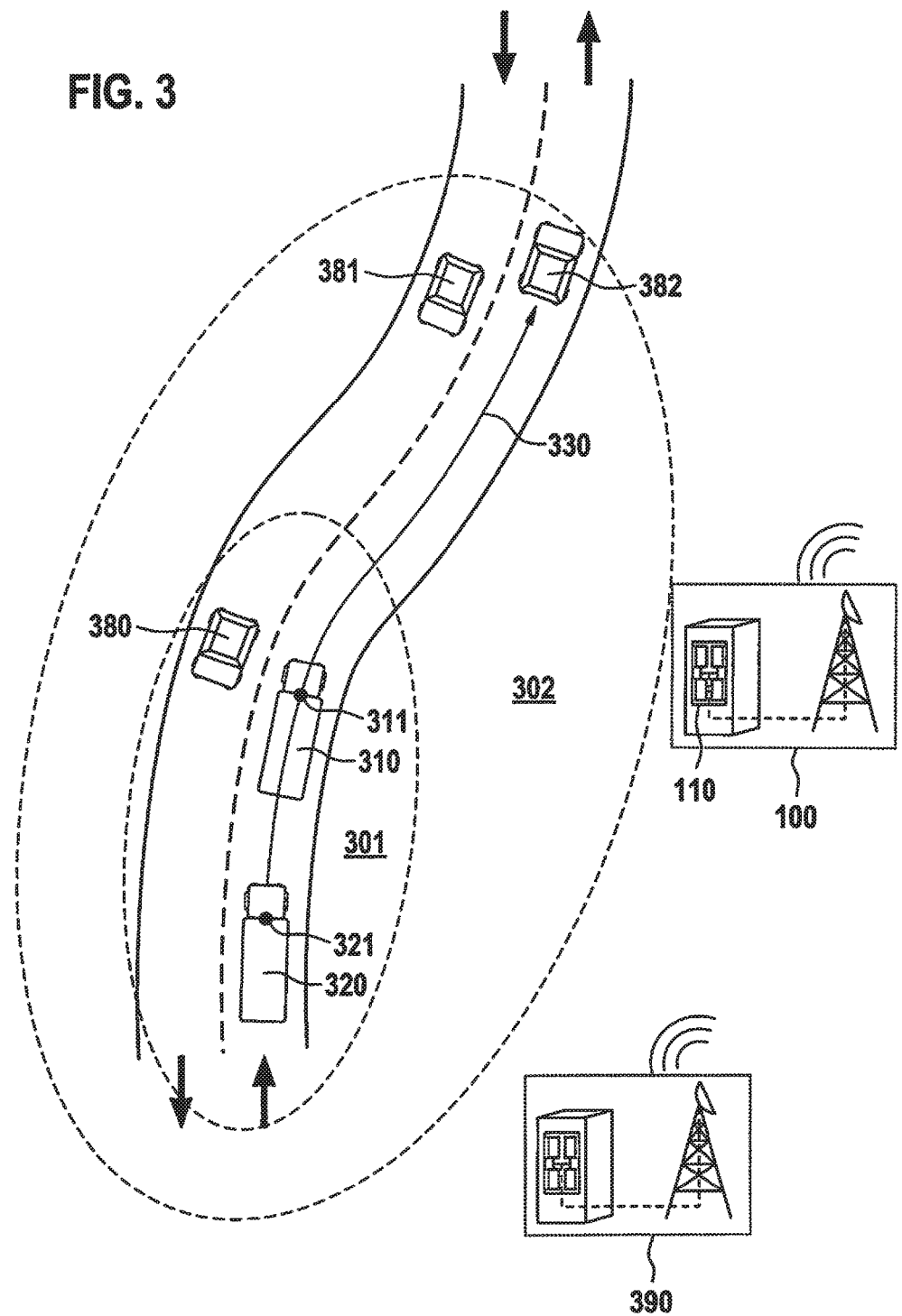
FIG. 3 shows, purely by way of example, an exemplifying embodiment.

FIG. 3 shows an exemplifying embodiment of method 400 according to the present invention. Here the at least two vehicles 310, 320 are embodied, by way of example, as trucks that are both following the same first trajectory 330, such that one vehicle 310 is located in front of the other vehicle 320 in a direction of travel, and they form a convoy. Further vehicles that likewise belong to the convoy can be located both in front of and behind the two vehicles 310, 320 in a direction of travel, and are not shown here.

The at least two vehicles 310, 320 each encompass at least one sensor 311, 321 that is embodied to acquire first environmental data values of a first environment 301 of the at least two vehicles 310, 320. The at least one sensor 311, 321 of the at least two vehicles 310, 320 is embodied, for example, as a video sensor and/or as a radar sensor and/or as an ultrasonic sensor and/or as a lidar sensor and/or as a further sensor type that is likewise suitable for detecting first environment 301.

Sensors 311, 321 of the at least two vehicles 310, 320 can furthermore also be different. In a further embodiment, not all the vehicles of the at least two vehicles 310, 320 encompass at least one sensor 311, 321. For example, every second or third vehicle of the at least two vehicles 310, 320 can also be embodied with at least one sensor 311, 321.

The at least one sensor 311, 321 can also be embodied so as also to indirectly detect first environment 301 of the at least two vehicles 310, 320. For example, first environment 301 can be detected in the form of wind conditions, by detecting forces that occur, for example as a result of side winds, in such a way that counter-steering motions that are necessary in order to keep at least one of the at least two vehicles 310, 320 in the lane are detected. Winds from the front or rear can be correspondingly detected by detecting acceleration operations that are necessary, for example, in order to maintain a constant speed for at least one of the at least two vehicles 310, 320. In a further embodiment, first environmental data values are acquired, by way of the at least one sensor 311, 321 of the at least two vehicles 310, 320, in such a way that they encompass further vehicles 380, i.e. a traffic density in first environment 301 of the at least two vehicles 310, 320 can be determined by way of first device 111 of first apparatus 110.

FIG. 3 furthermore shows a computation unit 100 that is embodied to ascertain first environmental data values by the fact that it requests or receives the acquired environmental data values of at least one of the at least two vehicles 310, 320. The computation unit is furthermore embodied to ascertain second environmental data values from an external server 390. This can involve, for example, weather data such as precipitation and/or wind speeds, and/or traffic data such as a traffic density, on the basis of further vehicles 381, 382, in the second environment of the at least two vehicles 310, 320.

External server 390 can be embodied, for example, as a weather station and/or as a traffic control center and/or as a radio transmitter that makes retrievable second environmental data values available, for example via radio connection and/or via internet, in such a way that they can be ascertained by way of second device 112 of first apparatus 110.

Figure 4:
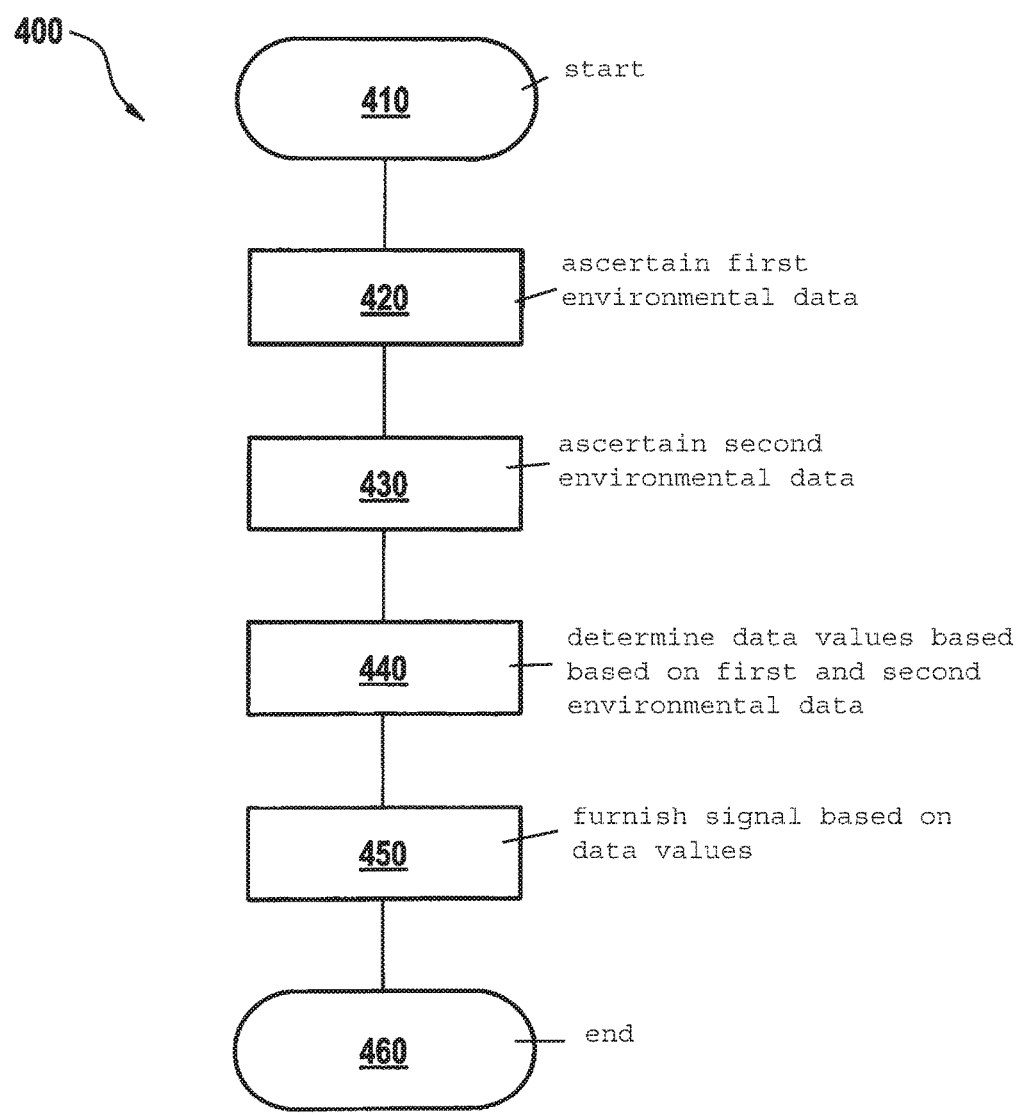
FIG. 4 shows in the form of a flow chart, purely by way of example, an exemplifying embodiment of a method for furnishing a signal.

FIG. 4 shows an exemplifying embodiment of a method 400 for furnishing a signal for operating at least two vehicles 310, 320 along a first trajectory 330.

Method 400 starts in step 410.

In step 420, first environmental data values are ascertained by way of at least one sensor 311, 321 of the at least two vehicles 310, 320, the first environmental data values representing a first environment 301 of the at least two vehicles 310, 320. The first environmental data values are acquired by way of the at least one sensor 311, 321 and they are transferred by way of a suitable transmitting and/or receiving unit, which is encompassed by at least one of the at least two vehicles, to first device 111 of first apparatus 110.

In step 430, second environmental data values are ascertained from an external server 390, the second environmental data values representing a second environment 302, dependent on first trajectory 330, of the at least two vehicles 310, 320, first environment 301 being encompassed by second environment 302.

In step 440, data values are determined on the basis of the first and second environmental data values.

In step 450, a signal is furnished on the basis of the determined data values in order to operate the at least two vehicles 310, 320.

Method 400 ends in step 460.

What is claimed is:

1. A method for operating at least two vehicles along a first trajectory, comprising:
ascertaining first environmental data values by way of at least one sensor of the at least two vehicles, the first environmental data values representing a first environment of the at least two vehicles;
ascertaining second environmental data values from an external server, the second environmental data values representing a second environment dependent on the first trajectory of the at least two vehicles, the first environment being encompassed by the second environment;
determining data values on the basis of the first and second environmental data values; and
furnishing a signal, on the basis of the determined data values, for affecting operation of at least one of the at least two vehicles.

2. The method as recited in claim 1, wherein the first environmental data values are ascertained by way of the at least one sensor of the at least two vehicles in such a way that a deviation of at least one of the at least two vehicles from the first trajectory is detected.

3. The method as recited in claim 2, wherein the first environmental data values are ascertained, as a function of the detected deviation, in such a way that the first environmental data values encompass air flows.

4. The method as recited in claim 1, wherein the signal is furnished in such a way that at least one of: (i) manual operation of the at least one of the at least two vehicles is requested, (ii) a second trajectory that deviates from the first trajectory is determined for the at least one of the at least two vehicles, (iii) a change in speed occurs for the at least one of the at least two vehicles, or (iv) a change in spacing between the at least two vehicles occurs.

5. The method as recited in claim 1, wherein at least one of the first and the second environmental data values are ascertained in such a way that the at least one of the first and the second environmental data values encompass a traffic density along the first trajectory.

6. The method as recited in claim 1, wherein the data values are determined, on the basis of the first and second environmental data values, in such a way that the first and the second environmental data values are plausibilized in accordance with predefined plausibilization criteria.

7. The method as recited in claim 1, wherein at least one of the first and the second environmental data values are ascertained in such a way that the at least one of the first and the second environmental data values encompass at least one of a road state and a friction value associated with the road state.

8. An apparatus for operating at least two vehicles along a first trajectory, comprising:
- a first device for ascertaining first environmental data values by way of at least one sensor of the at least two vehicles, the first environmental data values representing a first environment of the at least two vehicles;
- a second device for ascertaining second environmental data values from an external server, the second environmental data values representing a second environment, dependent on the first trajectory, of the at least two vehicles, the first environment being encompassed by the second environment;
- a third device for determining data values on the basis of the first and second environmental data values; and
- a further device for furnishing a signal, on the basis of the determined data values, for affecting operation of at least one of the at least two vehicles.

9. An apparatus for operating a vehicle, comprising:
- a transmitting and receiving device for: (i) transmitting data, the data being acquired by at least one sensor of the vehicle, and (ii) receiving a signal for operating the vehicle; and
- a vehicle device for operating the vehicle as a function of the received signal;
- wherein the signal is furnished based on data values that are determined based on (i) first environmental data values ascertained by way of the at least one sensor of the vehicle or at least one sensor of a second vehicle, the first environmental data values representing a first environment of the vehicle and the second vehicle, and (ii) second environmental data values received from an external server, the second environmental data values representing a second environment dependent on a first trajectory of the vehicle and the second vehicle, the first environment being encompassed by the second environment.

10. The apparatus as recited in claim 9, wherein the first environmental data values are ascertained in such a way that a deviation of at least one of the at least two vehicles from the first trajectory is detected.

11. The apparatus as recited in claim 10, wherein the first environmental data values are ascertained, as a function of the detected deviation, in such a way that the first environmental data values encompass air flows.

12. The apparatus as recited in claim 9, wherein the signal is furnished in such a way that at least one of: (i) manual operation of the vehicle is requested, (ii) a second trajectory that deviates from the first trajectory is determined for the vehicle, (iii) a change in speed occurs for the vehicle, or (iv) a change in spacing between the vehicle and the second vehicle at occurs.

13. The apparatus as recited in claim 8, wherein the first environmental data values are ascertained by way of the at least one sensor of the at least two vehicles in such a way that a deviation of at least one of the at least two vehicles from the first trajectory is detected.

14. The apparatus as recited in claim 13, wherein the first environmental data values are ascertained, as a function of the detected deviation, in such a way that the first environmental data values encompass air flows.

15. The apparatus as recited in claim 8, wherein the signal is furnished in such a way that at least one of: (i) manual operation of at least one of the at least two vehicles is requested, (ii) a second trajectory that deviates from the first trajectory is determined for at least one of the at least two vehicles, (iii) a change in speed occurs for at least one of the at least two vehicles, or (iv) a change in spacing between the at least two vehicles occurs.

* * * * *